Sept. 15, 1964  K. W. KAMPERT ETAL  3,148,791
TRACTOR LOADERS
Filed Dec. 18, 1961  3 Sheets-Sheet 2

Inventors:
Keith W. Kampert
Richard F. Zimmerman
Paul O. Pippel Atty.

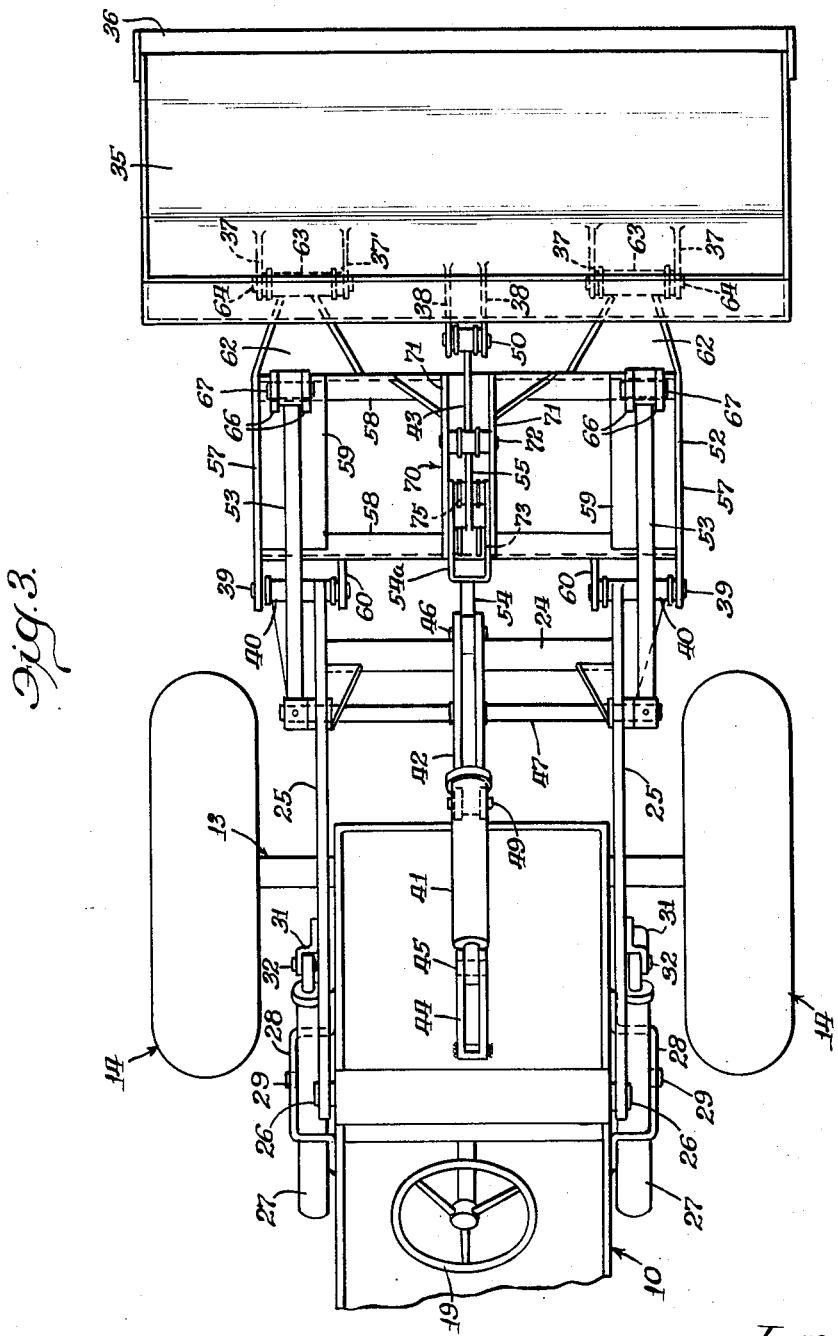

United States Patent Office 3,148,791
Patented Sept. 15, 1964

3,148,791
TRACTOR LOADERS
Keith W. Kampert, Libertyville, and Richard F. Zimmerman, Waukegan, Ill., assignors to The Frank G. Hough Co., a corporation of Illinois
Filed Dec. 18, 1961, Ser. No. 160,145
6 Claims. (Cl. 214—140)

This invention relates generally to tractor loaders, and more particularly to loader constructions for a front-end-type tractor loader.

It is a primary object of the present invention to provide a high-lift attachment for a front-end-type tractor loader.

It is another object to provide a high-lift attachment for a front-end-type tractor loader which is easily inserted in the loader arrangement to provide a substantially increased lifting height for the bucket of the loader, and which may easily be removed to provide a normal loader working arrangement.

It is another object to provide a high-lift attachment for a front-end-type tractor loader which greatly increases the lifting range of the loader and wherein the attachment includes means cooperating with the bucket, the normally used bucket-tilting ram, and the linkage means to provide complete control of the bucket in the tilting and dumping thereof by operation of the bucket-tilting ram.

Other objects and features of the present invention will be apparent upon a perusal of the following specification and drawings in which:

FIGURE 3 is a top plan view of the structure shown in FIGURE 2.

The present embodiment is the preferred embodiment, but it is to be understood that changes can be made in the present embodiment by one skilled in the art without departing from the spirit and scope of the present invention.

Generally, the present invention cooperates with a tractor loader which in the present embodiment is of the four-wheeled, rubber-tired type with the operator's compartment disposed forwardly of the engine compartment of the tractor. The loader mechanism is operatively carried on the forward end of the tractor and extends forwardly thereof. The loader mechanism comprises a boom which is pivotally connected to the tractor and extends forwardly thereof. A certain hydraulic means connected between the tractor and the boom provides for raising and lowering of the forward end of the boom. A digging bucket is pivotally connected to the forward end of the boom. Further, a linkage arrangement comprising a bucket-tilting hydraulic ram and a leverage arrangement is provided. The leverage arrangement is carried on the boom intermediate the ends thereof and includes links by which the leverage arrangement is connected to the bucket. The bucket-tilting hydraulic ram is pivotally connected between the tractor and the leverage arrangement. The bucket is pivoted relative to the boom by extensions and retractions of the bucket-tilting ram. Normal operations of the tractor loader involves the forward movement of the tractor with the bucket in the ground level digging position into a pile of material which is being worked. When the bucket is filled, it is tilted rearwardly to a carrying position by operation of the bucket-tilting ram and the boom may be partially raised to position the loaded bucket in a convenient carrying position. The tractor is then operated to transport the loaded bucket to some remote position for dumping. In the dumping operation, the boom is generally raised to a position such as shown by the dotted lines in FIGURE 1, and the bucket-tilting ram is operated to dump the bucket.

Figure 1:
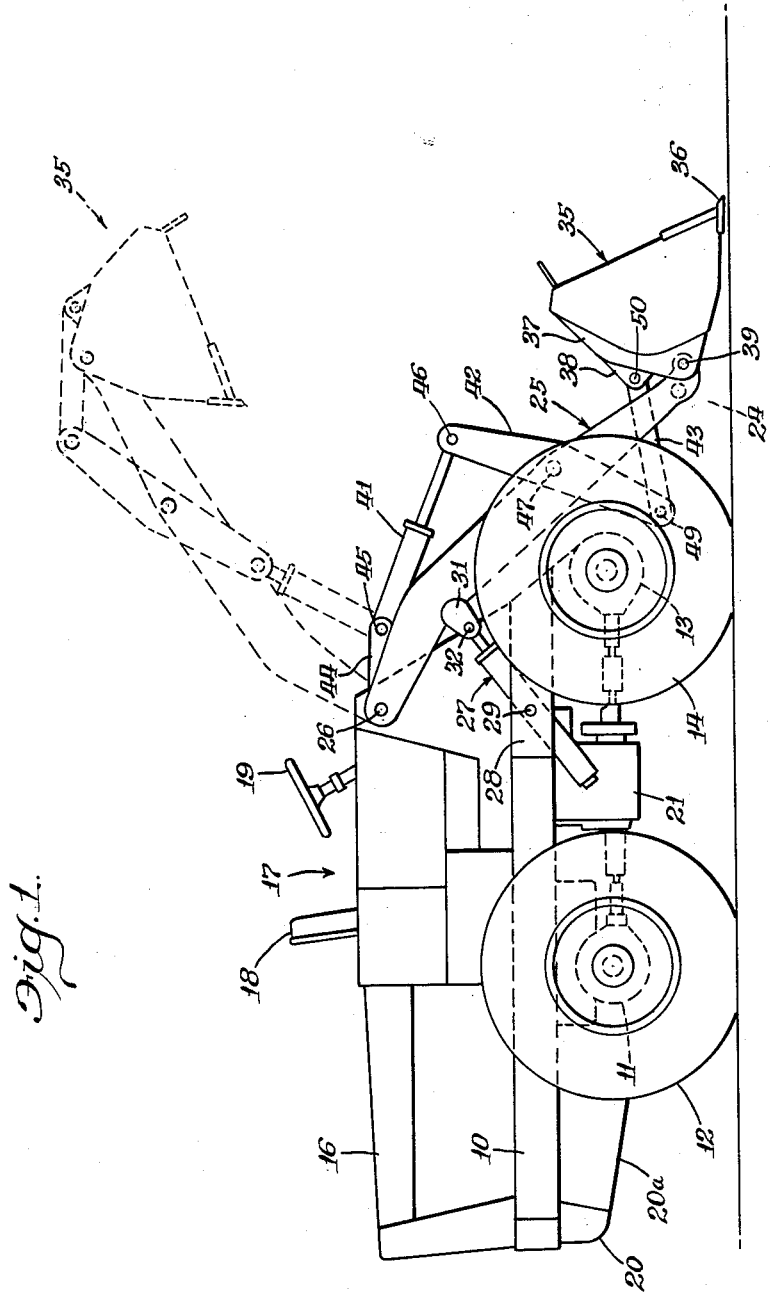
FIGURE 1 is a side-elevational view of a front-end-type tractor loader having a normal bucket-lifting range.
Figure 2:
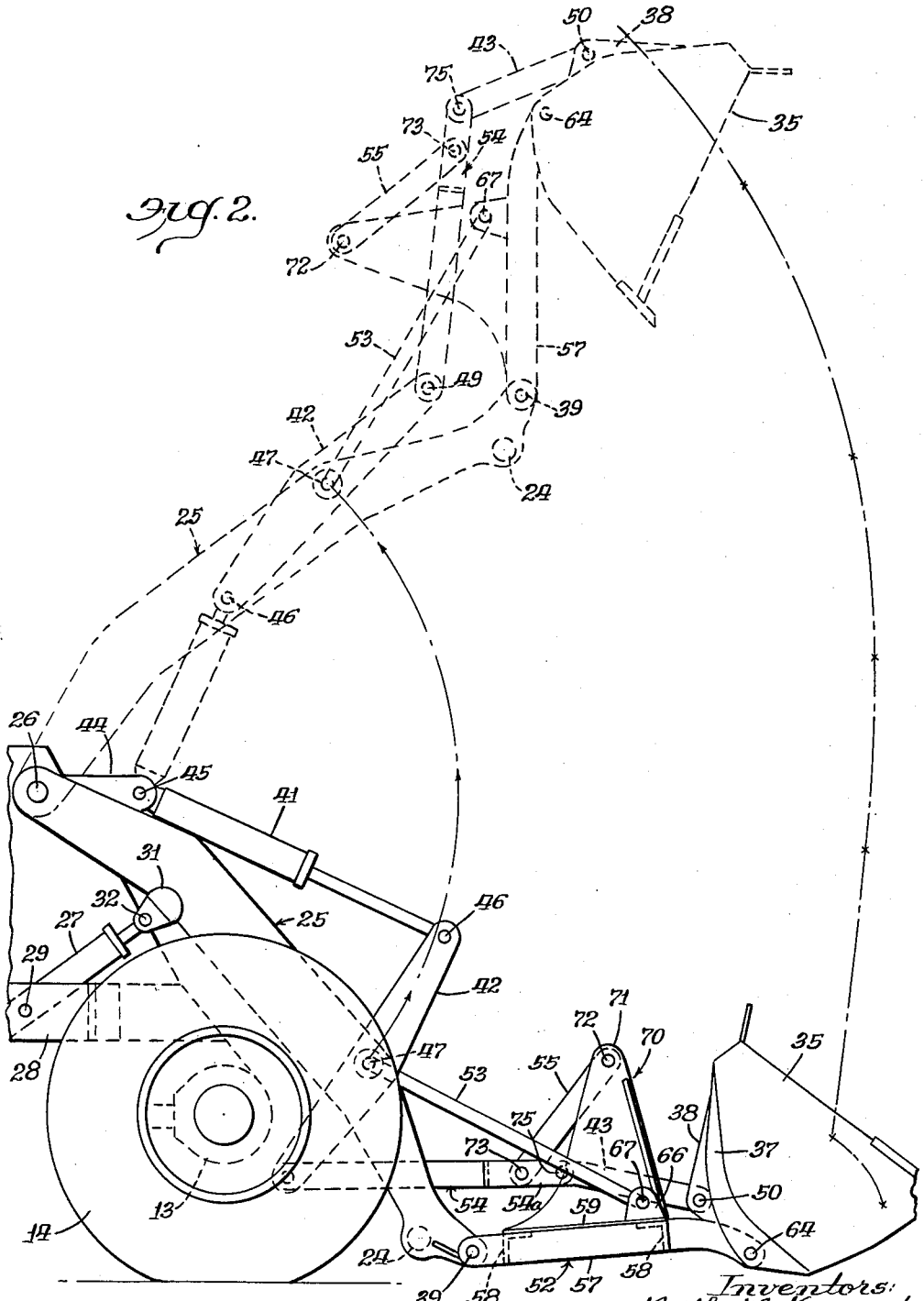
FIGURE 2 is an enlarged partial view similar to FIGURE 1 but with the inclusion of the high-lift attachment between the bucket and the remaining elements of the loader.

Oftentimes when dumping into a relatively high bin or truck body, the bucket is required to be dumped from a substantially greater height than can normally be achieved by the aforedescribed loader arrangement. Merely lengthening the boom in a loader such as above described provides a generally unsatisfactory solution since the normal desirability of working the bucket close to the forward end of the tractor is then lost. With the high-lift attachment of the present invention the loader arrangement may easily be increased in effective length to provide a working arrangement which permits dumping at substantially increased heights. The high-lift attachment is secured in the loader arrangement by first removing the bucket from the forward end of the boom and disconnecting it from the linkage means. The rearward end of the attachment is then pinned to the forward end of the boom and the bucket is pivotally connected to the forward end of the attachment. A pair of rigid link assemblies are connected between the upper side of the frame portion of the high-lift attachment and the boom intermediate the ends thereof to hold the high-lift attachment against any pivotal movement relative to the boom. To pivot the bucket relative to the high-lift attachment, the link which formed the part of the linkage means which pivotally connected to the bucket is pivotally connected to the forward end of the attachment lever arrangement. The rearward end of that lever arrangement is pivotally connected to the leverage assembly of the linkage means at the point where the bucket link is normally connected. The high-lift attachment is further provided with an upright support which supports the attachment lever arrangement and has a link pivotally connected thereto and positioned to depend therefrom. The lower end of that link is pivotally connected to a lever which is inserted between the linkage means and the normally used bucket link. The operation of the loader with the high-lift attachment is substantially identical to the operation of the loader of FIGURE 1. In other words, when the boom-raising hydraulic rams are substantially completely retracted, the bucket is in the lowermost position adjacent ground level. Further, when the bucket-tilting ram is extended to the position shown in FIGURE 1, that same operated position in FIGURE 2 will cause the bucket to be positioned in the ground level digging position. FIGURE 2 shows the position of the bucket when the bucket-tilting ram is substantially completely extended, an operated position which is different from the operated position of FIGURE 1. In FIGURE 1 the bucket-tilting ram is slightly short of completely extended. If the bucket-tilting ram in FIGURE 1 is completely extended, the bucket shown therein will also be pivoted rearwardly relative to the boom to a position such as shown in FIGURE 2. The position of the bucket shown in FIGURE 2 is commonly called the break-out position. If the boom-raising rams are then completely extended, the boom and high-lift attachment will be carried upwardly to a position such as shown by the dotted lines in FIGURE 2. Substantially complete retraction of the bucket-tilting ram will then cause the bucket to be tipped forwardly to a dump position such as shown in the dotted lines in FIGURE 2. The dump position of the bucket in the high-lift position shown in FIGURE 2 differs from that shown by the dotted lines in FIGURE 1 primarily in the substantially increased dumping height of the bucket.

The high-lift attachment may be easily removed by merely removing the various pins which interconnect the high-lift attachment and its levers to the bucket, the boom and the linkage means. By reinserting the pins which pivotally connect the bucket to the forward end of the boom and the pin which connects the bucket link to the lever of the linkage arrangement, the loader arrangement may be returned to that shown in FIGURE 1.

In detail, the front-end-type loader shown in FIGURE 1 comprises a tractor and a loader operatively carried by the tractor and extending forwardly thereof. The tractor comprises a frame 10 carried at the rearward end thereof on an axle assembly 11 which in turn is connected to the rear wheels 12, and at the forward end on a forward axle assembly 13 which in turn is connected to the forward wheels 14. An engine compartment 16 is carried on the rearward end of the frame 10. An operator's compartment 17 is carried on the frame 10 forwardly of the engine compartment 16. The tractor shown in FIGURE 1 further comprises a seat 18 and a steering wheel 19 carried in the operator's compartment 17, a counterweight 20 and fuel tank 20a secured to the frame 10 at the rearward end thereof to depend therefrom, and the lower portion of a transmission or transfer drive case 21 which is connected to provide a driving train to the forward and rearward axle assemblies 13 and 11.

The loader comprises a boom 25 which is pivotally connected at one end thereof to the tractor by pin means 26. The boom 25 is formed in duplicate boom arm portions disposed one on each side of the tractor. The other end of the boom which extends generally forwardly of the tractor is reinforced by a brace member 24 which is connected between the boom arms. The forward end of the boom is raised and lowered by a pair of hydraulic rams 27 disposed one on each side of the tractor. The cylinder portion of each hydraulic ram 27 is pivotally carried on one side of the frame 10 by a bracket 28 and a pin 29. The rod end of each hydraulic ram 27 is pivotally connected to one of the boom arms of the boom 25 intermediate the ends thereof by a bracket 31 and a pin 32. Each of the brackets 31 is secured to one of the boom arms of the boom 25 intermediate the ends thereof.

The bucket 35 may be constructed in any suitable form known in the art. The forward marginal edge of the bottom wall of the bucket 35 is provided with a cutting edge 36. Suitable flanges 37 and 38 are secured to the rearward side of the rear wall of the bucket for connecting the bucket in the loader arrangement. The bucket 35 is pivotally carried on the forward end of the boom 25 by a pin 39 inserted through one pair of the flanges 37 and a bearing 40. The bearings 40 which form a part of the boom 25 are shown in FIGURE 3.

The linkage means of the loader comprises a bucket-tilting hydraulic ram 41, a lever assembly 42, and a link 43. The head end of the hydraulic ram 41 is pivotally connected to a bracket 44 by a pin 45. The bracket 44 is secured by any means such as welding to the upper forward end of the tractor. The rod end of the hydraulic ram 41 is pivotally connected to one end of the lever assembly 42 by a pin 46. The lever assembly 42 is pivotally carried intermediate its ends on a shaft means 47 between the arms of the boom 25 and intermediate the ends thereof as may be seen in FIGURE 3. The lower end of the lever assembly 42 is pivotally connected to one end of the link 43 by a pin 49. The other end of the link 43 is pivotally connected between the flanges 38 by a pin 50.

The various members of the linkage means are so relatively positioned that when the hydraulic ram 41 is short of being completely extended, the bucket 35 is positioned in the ground level digging position when the boom 25 is in its lowermost position. The arrangement is further such that when the ram 41 is completely extended, the bucket is pivoted rearwardly through an angle of approximately 40 degrees to the break-out position. If the boom 25 is then fully raised by extension of the hydraulic rams 27, and if the hydraulic ram 41 is substantially completely retracted the bucket will be dumped to a position such as shown by the dotted lines in FIGURE 1.

Any suitable hydraulic fluid conduit, pump and valve means (not shown) may be provided for selective operation of the hydraulic rams 27 and 41 by the operator of the tractor loader.

The high-lift attachment which is shown in FIGURES 2 and 3, comprises a frame 52, a pair of brace members 53, and levers 54 and 55.

The frame member 52 comprises a pair of side members 57 which are secured in a spaced-apart relationship to each other at the ends of a pair of spaced-apart angle members 58 as may be seen in FIGURE 3. The angle members 58 are each of such a length that the members 57 are spaced apart a distance substantially equal to the spacing between the outwardmost flanges 37 on the bucket 35. The arrangement of the two side members 57 and the two angle members 58 is reinforced by a pair of plates 59 which are secured on top of the angle members 58 at each end thereof by any means such as welding. The rearward ends of the members 57 extend rearwardly of the rearwardly disposed angle member 58 to form a rearwardly extending flange portion, and each of those flange portions is provided with a hole therethrough for receiving a pin. The frame member 52 is further provided with a pair of flanges 60. Each of the flanges 60 is secured to the rearward angle member 58 to extend in a rearward direction and in a spaced relationship from one of the flange portions of the members 57. The spacing between the flanges 60 and their associated flange portions of the members 57 is substantially equal to the spacing between the flanges 37 on the bucket 35. Thus it may be seen that the flanges 60 and the flange portions of the members 57 may be positioned in cooperation with the bearings 40 at the forward end of the boom 25 to permit the rearward end of the frame 52 to be pivotally connected to the forward end of the boom 25 by the pins 39.

The frame member 52 of the high-lift attachment further comprises a pair of brackets 62 which extend forwardly of the frame 52 and are mounted in a transversely spaced-apart relationship to each other. In the present embodiment, the brackets 62 are formed by welding suitable members to forward extending portions of the side members 57. Each of the brackets 62 is provided with a bearing member 63 at the forward end thereof. The bearing members 63 are substantially identical to the bearing members 40 on the forward end of the boom 25. The brackets 62 are formed to suitably carry the bearing members 63 so that the bearing members 63 may be positioned between the flanges 37 on the bucket 35. A pair of pins 64, similar to pins 39, is then inserted through the flanges 37 and the bearing members 63 to pivotally connect the bucket 35 to the forward end of the frame 52 of the high-lift attachment.

The pair of braces 53 functions to hold the frame 52 of the high-lift attachment in one pivotal position relative to the boom 25. One end of each of the braces 53 is pivotally connected between a pair of flanges 66 by a pin 67. The two pairs of flanges 66 are secured to the upper forward side of the reinforcing plates 59 by any means such as welding. Each of the braces 53 is at the other end thereof connected to an extending end portion of the shaft means 47. The triangular arrangement formed by the relative positions of the shaft means 47, the pins 39, and the pins 67 renders the frame 52 rigidly outwardly extending of the boom 25 as may be seen in FIGURE 2. When the boom 25 is in its lowermost position such as shown in FIGURES 1 and 2, the pins 64 are positioned substantially the same distance above the ground as the pins 39.

The levers 54 and 55 of the high-lift attachment are supported by a tower arrangement 70. The tower arrangement 70 comprises a pair of spaced-apart plates 71 which are secured on the upper side of the angle members 58 to upstand therefrom. One end of the lever 55 is pivotally connected between the plates 71 at the upper end thereof by a pin 72. The other end of the lever 55 is pivotally connected within the bifurcated end 54a of the lever 54 by a pin 73. The pin 73 is journaled through the bifurcated end portion 54a of the lever 54 at a position spaced from the extreme end of the bifurcated portion. The extreme end of the bifurcated portion 54a of the lever 54 is pivotally connected to the rearwardly extending end of the link 43 by a pin 75. The pin 75 is substantially the same size as the pin 49 shown in FIGURE 1. The rearward end of the lever 54 is pivotally connected to the lower end of the lever 42 by the pin 49. The levers 54 and 55 are each formed of such a length that when the lever 42 is positioned as shown in FIGURE 1, the bucket 35 is positioned in the ground level digging position, and further, so that when the hydraulic ram 41 is completely extended, the bucket 35 is pivoted rearwardly to the breakout position shown in FIGURE 2. The dotted line view in FIGURE 2 shows the high-lift dump position of the bucket 35 and the disposition of the various members of the high-lift attachment when the hydraulic ram 41 is substantially completely retracted. The levers 54 and 55 of the high-lift attachment will cooperate with the levers 42 and 43 and the hydraulic ram 41 to cause the bucket 35 to assume the same pivoted positions relative to ground level in the operation of the loader with the high-lift attachment as occur with the operation of the loader assembled as shown in FIGURE 1.

The loader arrangement is converted from that shown in FIGURE 1 to that shown in FIGURES 2 and 3 by firstly removing the pins 39 and 49 from the loader arrangement shown in FIGURE 1. This will free the bucket 35 and the lever 43 respectively from the boom 25 and the lever 42. The rearward end of the high-lift attachment is then connected to the forward end of the boom 25 by the reinsertion of the pins 39 in the forward end of the boom 25 and the rearward end of the high-lift attachment. The rearward end of the braces 53 is then connected to the extending end portions of the shaft assembly 47. The rearward end of the lever 54 may then be pivotally connected to the lower end of the lever 42 by the reinsertion of the pin 49. The bucket 35 is then pivotally connected to the forward end of the high-lift attachment by the insertion of the pins 64 through the flanges 37 of the bucket 35 and the bearings 63 of the high-lift attachment. The rearward end of the link 43 is then pivotally connected to the forward end of the lever 54 by the insertion of the pin 75 to complete the assembly of the loader as a high-lift loader. From the foregoing, it may be seen that the loader may be converted from a high-lift loader to a loader such as shown in FIGURE 1 by the simple removal of the various pins and the connection of the bucket 35 to the boom 25 and the linkage means of FIGURE 1.

Having described the invention, what is considered new and desired to be protected by Letters Patent is:

1. In a tractor loader having a boom operatively connected to said tractor and extending forwardly thereof with a bucket normally pivotally mounted on the forward end of said boom, linkage means normally connected to said bucket, and actuating means connected between said tractor and said linkage means for controlling the attitude of said bucket, the improvement comprising a high-lift attachment for substantially increasing the lifting range of said boom, said high-lift attachment including a frame member rigidly attachable to said boom and pivotally attachable to said bucket and lever means insertable between and pivotally connectable to said linkage means and pivotally attached to said frame for producing substantially the same attitude of said bucket in response to substantially the same movements of said actuating means.

2. A high-lift attachment for mounting a bucket on a loader tractor comprising boom means pivotally secured to said tractor, first ram means operatively connected between said boom means and said tractor for raising and lowering said boom means, first lever means pivotally secured at a point intermediate of its ends to said boom means, second ram means operatively connected between said tractor and one end of said first lever means, second lever means pivotally connected to the other end of said first lever means, frame means rigidly secured to said boom means, said bucket being pivotally attached to said frame means, tower means rigidly secured to said frame means, third lever means pivotally connected at one end to said tower means and pivotally connected at the other end to said second lever means at a point intermediate the ends thereof, and fourth lever means pivotally connected at one end to the other end of said second lever means and pivotally connected at the other end to said bucket.

3. A high-lift attachment for mounting a bucket on a loader tractor according to claim 2 wherein brace means are connected between said boom means and said frame means to prevent relative movement therebetween.

4. In a loader tractor having a bucket, boom means pivotally mounted on said tractor, a first ram means operatively connected between said tractor and said boom means for raising and lowering said boom means, first lever means pivotally mounted intermediate its ends to said boom means, and second ram means operatively connected between said tractor and said first lever means, the improvement comprising frame means rigidly secured to said boom means and pivotally attached to said bucket, link means pivotally attached to each of said first lever means and said bucket, and second lever means pivotally connected to each of said frame means and said link means whereby said second ram means can control the attitude of said bucket.

5. The improvement according to claim 4 wherein said link means comprises third lever means pivotally connected to said first lever means and fourth lever means pivotally connected to said third lever means and pivotally connected to said bucket, said second lever means being pivotally connected to said third lever means at a point between the connections thereto of said first lever means and said fourth lever means.

6. The improvement according to claim 5 wherein brace means are connected between said boom means and said frame means to prevent relative movement therebetween.

References Cited in the file of this patent

UNITED STATES PATENTS

| | | |
|---|---|---|
| 2,418,299 | Gorsuch | Apr. 1, 1947 |
| 2,449,212 | Fraga | Sept. 14, 1948 |
| 2,595,896 | Shoemaker | May 6, 1952 |
| 2,630,231 | Klinge | Mar. 3, 1953 |
| 2,788,906 | Davis | Apr. 16, 1957 |
| 2,802,584 | Przybylski | Aug. 13, 1957 |
| 2,897,987 | Johansson | Aug. 4, 1959 |
| 2,944,633 | Richards | July 12, 1960 |